United States Patent
Ippatapu

(10) Patent No.: US 11,095,550 B2
(45) Date of Patent: Aug. 17, 2021

(54) EVALUATING, WEIGHTING, AND SCHEDULING THE USE OF NETWORK LINKS

(71) Applicant: EMC IP Holding Company LLC, Hopkinton, MA (US)

(72) Inventor: Venkata L. R. Ippatapu, Westborough, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/398,677

(22) Filed: Apr. 30, 2019

(65) Prior Publication Data
US 2020/0351194 A1 Nov. 5, 2020

(51) Int. Cl.
*H04L 12/721* (2013.01)
*H04L 29/08* (2006.01)
*H04L 12/751* (2013.01)

(52) U.S. Cl.
CPC ............ *H04L 45/124* (2013.01); *H04L 45/02* (2013.01); *H04L 67/1095* (2013.01)

(58) Field of Classification Search
CPC ... H04L 45/124; H04L 45/02; H04L 67/1095; H04L 67/10; H04L 47/36; H04L 47/28; H04L 47/2441; H04L 43/10; H04L 43/16; H04L 12/40182; H04W 72/04; H04W 72/1252; H04W 72/10; H04W 24/04
See application file for complete search history.

(56) References Cited

U.S. PATENT DOCUMENTS

| | | | | |
|---|---|---|---|---|
| 6,166,729 A | * | 12/2000 | Acosta | H04N 5/232 348/207.99 |
| 10,320,691 B1 | * | 6/2019 | Matthews | H04L 47/26 |
| 2006/0224813 A1 | * | 10/2006 | Rooholamini | H04L 45/125 710/316 |
| 2009/0323519 A1 | * | 12/2009 | Pun | H04L 45/28 370/225 |
| 2019/0288908 A1 | * | 9/2019 | Lee | H04W 40/24 |

* cited by examiner

*Primary Examiner* — Ricardo H Castaneyra
(74) *Attorney, Agent, or Firm* — Amin, Turocy & Watson, LLP

(57) ABSTRACT

The described technology is generally directed towards evaluating, weighting, and scheduling the use of network links. According to an embodiment, a system can comprise a memory that can store computer executable components, and a processor that can execute the computer executable components stored in the memory. The components can comprise a link mapper that can identify at least two network links between a first device and a second device, resulting in identified network links. The system can further comprise a link weighting component that can assign weights to respective ones of the identified network links resulting in weighted network links, based on a criterion and characteristics of the identified network links, the first device and the second device. The system can further comprise a link scheduler that can schedule the weighted network links based on the weights assigned to the respective ones of the weighted network links.

20 Claims, 10 Drawing Sheets

500

MTU 502

| Link | MTU | MTU Index |
|---|---|---|
| L2 | 9000 | 1 |
| L3 | 9000 | 1 |
| L8 | 9000 | 1 |
| L9 | 9000 | 1 |
| L13 | 9000 | 1 |
| L14 | 9000 | 1 |
| L15 | 9000 | 1 |
| L1 | 1500 | 2 |
| L4 | 1500 | 2 |
| L5 | 1500 | 2 |
| L6 | 1500 | 2 |
| L7 | 1500 | 2 |
| L10 | 1500 | 2 |
| L11 | 1500 | 2 |
| L12 | 1500 | 2 |
| L16 | 1500 | 2 |

LATENCY 504

| Link | Latency (ms) | Latency Index |
|---|---|---|
| L1 | 0 | 0 |
| L16 | 0 | 0 |
| L2 | 5 | 2 |
| L4 | 5 | 2 |
| L6 | 5 | 2 |
| L7 | 5 | 2 |
| L8 | 5 | 2 |
| L10 | 5 | 2 |
| L3 | 10 | 3 |
| L11 | 10 | 3 |
| L14 | 10 | 3 |
| L15 | 10 | 3 |
| L5 | 15 | 4 |
| L9 | 15 | 4 |
| L12 | 20 | 5 |
| L13 | 20 | 5 |

THROUGHPUT 506

| Link | Throughput (MB/sec) | Throughput Index |
|---|---|---|
| L3 | 250 | 1 |
| L8 | 250 | 1 |
| L16 | 250 | 1 |
| L4 | 125 | 2 |
| L9 | 125 | 2 |
| L10 | 125 | 2 |
| L11 | 125 | 2 |
| L13 | 125 | 2 |
| L14 | 125 | 2 |
| L15 | 125 | 2 |
| L1 | 100 | 3 |
| L2 | 100 | 3 |
| L5 | 100 | 3 |
| L7 | 100 | 3 |
| L6 | 100 | 3 |
| L12 | 100 | 3 |

READ/WRITE 508

| Link | Read or Write | R/W Index |
|---|---|---|
| L2 | WRITE | 0 |
| L3 | WRITE | 0 |
| L4 | WRITE | 0 |
| L7 | WRITE | 0 |
| L10 | WRITE | 0 |
| L11 | WRITE | 0 |
| L12 | WRITE | 0 |
| L15 | WRITE | 0 |
| L1 | READ | 1 |
| L5 | READ | 1 |
| L6 | READ | 1 |
| L8 | READ | 1 |
| L9 | READ | 1 |
| L13 | READ | 1 |
| L14 | READ | 1 |
| L16 | READ | 1 |

WEIGHT DETERMINATION 610

| Link | MTU | Latency (ms) | Throughput (MB/sec) | Read or Write | MTU Index | Latency Index | Throughput Index | R/W Index | Weight 660 | Scheduling Order 670 |
|---|---|---|---|---|---|---|---|---|---|---|
| L1 | 1500 | 6 | 100 | READ | 2 | 0 | 3 | 1 | 6 | 5 |
| L2 | 9000 | 3 | 100 | WRITE | 1 | 2 | 3 | 0 | 6 | 5 |
| L3 | 9000 | 10 | 250 | WRITE | 1 | 3 | 1 | 0 | 5 | 4 |
| L4 | 1500 | 5 | 125 | WRITE | 2 | 2 | 2 | 0 | 6 | 5 |
| L5 | 1500 | 15 | 125 | READ | 2 | 4 | 2 | 1 | 9 | 2 |
| L6 | 1500 | 5 | 100 | READ | 2 | 2 | 3 | 1 | 8 | 3 |
| L7 | 1500 | 5 | 100 | WRITE | 2 | 2 | 3 | 0 | 7 | 4 |
| L8 | 9000 | 5 | 100 | READ | 1 | 2 | 3 | 1 | 7 | 4 |
| L9 | 9000 | 15 | 250 | READ | 1 | 4 | 1 | 1 | 7 | 4 |
| L10 | 1500 | 5 | 125 | WRITE | 2 | 2 | 2 | 0 | 6 | 5 |
| L11 | 1500 | 10 | 125 | WRITE | 2 | 3 | 2 | 0 | 7 | 4 |
| L12 | 1500 | 20 | 100 | WRITE | 2 | 5 | 3 | 0 | 10 | 1 |
| L13 | 9000 | 20 | 125 | READ | 1 | 5 | 2 | 1 | 9 | 2 |
| L14 | 9000 | 10 | 125 | READ | 1 | 3 | 2 | 1 | 7 | 4 |
| L15 | 9000 | 10 | 125 | WRITE | 1 | 3 | 2 | 0 | 6 | 5 |
| L16 | 1500 | 6 | 250 | READ | 2 | 0 | 1 | 1 | 4 | 5 |

ORDER 620

| Link | Scheduling Order 670 |
|---|---|
| L12 | 1 |
| L5 | 2 |
| L13 | 2 |
| L6 | 3 |
| L16 | 3 |
| L3 | 4 |
| L7 | 4 |
| L8 | 4 |
| L9 | 4 |
| L11 | 4 |
| L14 | 4 |
| L1 | 5 |
| L2 | 5 |
| L4 | 5 |
| L10 | 5 |
| L15 | 5 |

*FIG. 6*

which like reference numerals indicate similar elements, and in which:

EVALUATING, WEIGHTING, AND SCHEDULING THE USE OF NETWORK LINKS

TECHNICAL FIELD

The subject application generally relates to network communications, and, for example, to adaptive scheduling of the use of network links, and related embodiments.

BACKGROUND

Modern application can require networked connectivity between two or more computing devices. For these applications, multiple network links can be available to a computing device, both for connecting to multiple other computing devices and for multiple links to the same computing device. In some circumstances, network links available to a computing device can differ in significant ways, including, round trip time (RTT) latency, the number of packet drops, the number of packet timeouts, throughput, maximum transmission unit for the link, number of re-transmits, and other similar characteristics. Differences in one or more of these characteristics can affect the performance of the network links, and the networked application.

One approach taken to utilize multiple available network links uses an arbitrary pattern of switching between network links, e.g., a round-robin approach. In many circumstances, this arbitrary approach can lead to problems, e.g., based at least on the differences between available links.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

According to an embodiment, a system can comprise a memory that stores computer executable components and a processor that can execute the computer executable components stored in the memory. The computer executable components can comprise a link mapper that can identify two or more network links between a first device and a second device, resulting in identified network links. The system can further comprise a link weighting component that can assign weights to respective ones of the identified network links resulting in weighted network links, based on a criterion and characteristics of the identified network links, the first device and the second device. The system can further comprise a link scheduler that can schedule the weighted network links based on the weights assigned to the respective ones of the weighted network links.

According to another embodiment, a computer-implemented method can comprise receiving, by a scheduling process executed by a processor of a device, a group of network links, identified by a link mapper, between a first device and a second device. The computer-implemented method can further comprise identifying, by the scheduling process, for a network link of the group of network links, a weight that can be assigned based on a criterion and characteristics of, the network links, the first device and the second device. The computer-implemented method can further comprise scheduling, by the scheduling process, use of the network link based on the weight.

According to another embodiment, a computer program product is provided. The computer program product can comprise machine-readable storage medium comprising executable instructions that, when executed by a processor, can facilitate performance of operations comprising identifying two or more network links between a first device and a second device, resulting in identified network links. The operations can further comprise assigning weights to respective ones of the identified network links resulting in weighted network links, based on a criterion and characteristics of the identified network links, the first device and the second device. The operations cam further comprise scheduling the weighted network links based on the weights assigned to the respective ones of the weighted network links.

BRIEF DESCRIPTION OF THE DRAWINGS

The technology described herein is illustrated by way of example and not limited in the accompanying figures in which like reference numerals indicate similar elements, and in which:

FIG. 5 depicts an example of links that can be analyzed, weighted, and scheduled, in accordance with one or more embodiments.

FIG. 6 depicts tables that illustrate an example approach to combining the sorted and ranked characteristics of example links, in accordance with one or more embodiments.

DETAILED DESCRIPTION

Various aspects described herein are generally directed towards facilitating evaluating, weighting, and scheduling the use of network links. As will be understood, the implementation(s) described herein are non-limiting examples, and variations to the technology can be implemented.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

The computer processing systems, computer-implemented methods, apparatus and/or computer program products described herein employ hardware and/or software to solve problems that are highly technical in nature (e.g., evaluating, weighting, and scheduling the use of network links), that are not abstract and cannot be performed as a set of mental acts by a human. For example, a human, or even a plurality of humans, cannot efficiently, accurately and effectively, manually evaluate, with the same level of accuracy and/or efficiency as the various embodiments described herein.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
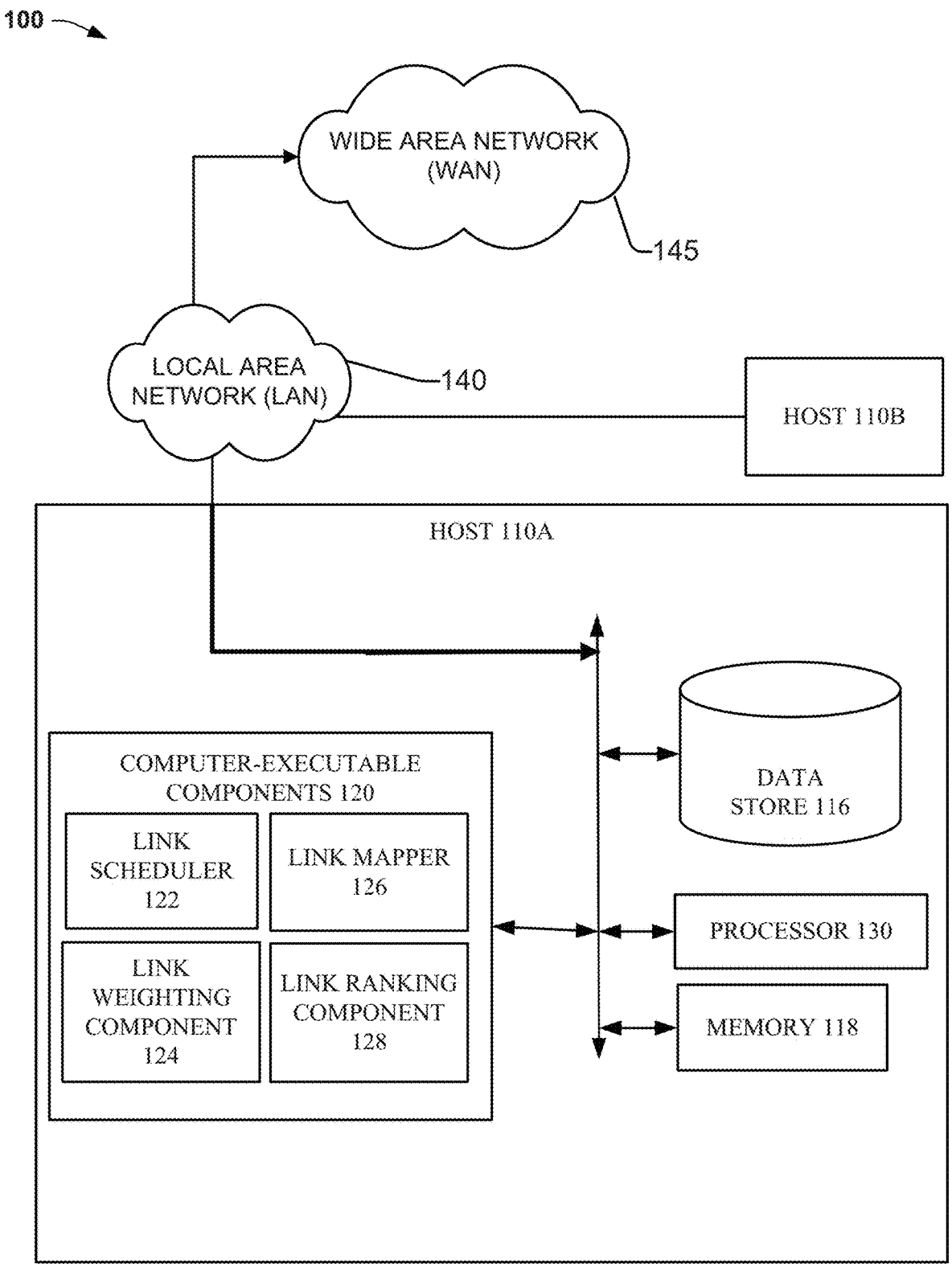
FIG. 1 illustrates a block diagram of an example, non-limiting system that can facilitate evaluating, weighting, and scheduling the use of network links, in accordance with various aspects and implementations of the subject disclosure.

FIG. 1 illustrates a block diagram of an example, non-limiting system 100 that can facilitate evaluating, weighting, and scheduling the use of network links, in accordance with various aspects and implementations of the subject disclosure.

Generally speaking, one or more embodiments can facilitate the scheduling, for advantageous use, of network links for communication between computing devices. Examples discussed below include the managing of links across of data replication systems, e.g., managing links to replicate as much data as possible in a time period by considering the sum of the overall behavior of the links. Benefits of one or more embodiments can include reducing data link loss risks, reducing overall response time, increasing data availability across replication systems, and increases in host data throughput. In one or more embodiments, host device 110A can be a Symmetrix Remote Data Facility (SRDF) System, provided by DELL EMC., provided by DELL EMC.

As depicted, host device 110A can be coupled to other host 110B by employing both local area network (LAN) 140 and wide area network (WAN) 145, these being described in further detail with FIG. 2. below. In some embodiments, processor 130 can comprise one or more of a central processing unit, multi-core processor, microprocessor, dual microprocessors, microcontroller, System on a Chip (SOC), array processor, vector processor, and/or another type of processor. Further examples of processor 130 are described below with reference to processing unit 1014 and FIG. 10. Such examples can be employed with any embodiments of the subject disclosure.

As discussed further below with FIG. 10, in some embodiments, memory 118 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 118 are described below with reference to system memory 1016 and FIG. 10. Such examples of memory 118 can be employed to implement any embodiments of the subject disclosure. Data store 116 can provide persistent storage to one or more embodiments.

According to multiple embodiments, processor 130 can comprise one or more types of processors and/or electronic circuitry that can implement one or more computer and/or machine readable, writable, and/or executable components and/or instructions that can be stored on memory 118. For example, processor 130 can perform various operations that can be specified by such computer and/or machine readable, writable, and/or executable components and/or instructions including, but not limited to, logic, control, input/output (I/O), arithmetic, and/or the like.

In one or more embodiments, in an example approach to performing the operations above, processor 130 can execute computer-executable components 120, including link mapper 126, link ranking component 128, link weighting component 124, and link scheduler 122.

In one or more embodiments, system 100 can identify two or more network links between a first device and a second device (e.g., by employing link mapper 126), resulting in identified network links. System 100 can further weight the identified network links resulting in weighted network links (e.g., by employing link weighting component 124), based on a criterion and characteristics of the identified network links, the first device and the second device. System 100 can further schedule the weighted network links for use by the first device and the second device (e.g., by employing link scheduler 122). To facilitate the weighing of the identified network links, one or more embodiments can rank the identified network links based on a characteristic of the identified network links, resulting in ranked network links (e.g., by employing link ranking component 128), wherein the criterion used by the link weighting component comprises the ranked network links.

It should be noted that example components depicted with figured referenced herein are included as examples, and the features of the component can be combined during implementation. For example, while computer-executable components 120 include link weighting component 124 and link ranking component 128 as distinct components, in alternative implementations these functions can be closely integrated, e.g., ranking and weighting of links being performed together, and not an independent processes, as shown.

Figure 2:
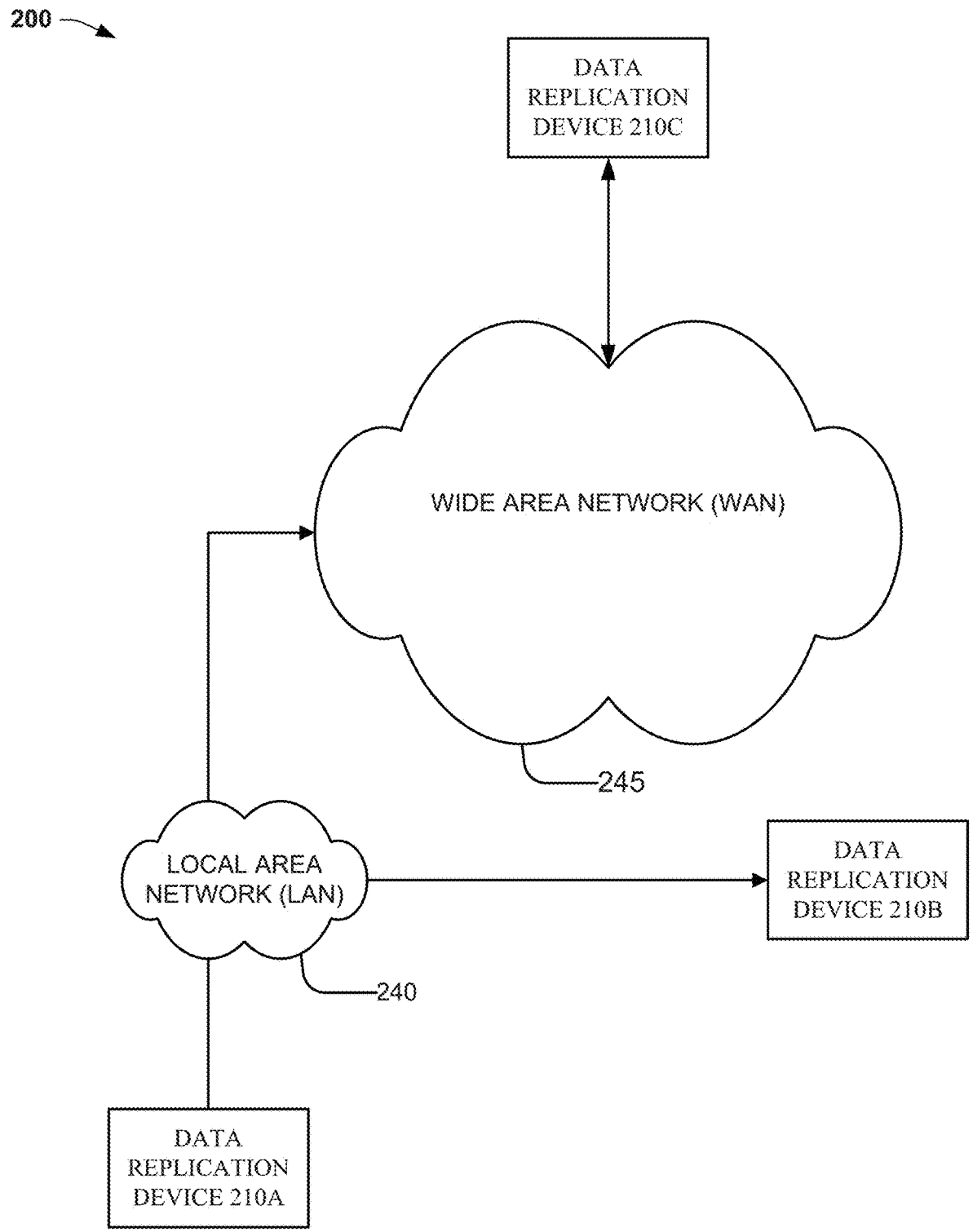
FIG. 2 illustrates an implementation of an example, non-limiting system that can facilitate evaluating, weighting, and scheduling the use of network links in a data replication system, in accordance with one or more embodiments described herein.

FIG. 2 illustrates an implementation of an example, non-limiting system 200 that can facilitate evaluating, weighting, and scheduling the use of network links in a data replication system, in accordance with one or more embodiments described herein. Repetitive description of like elements and/or processes employed in respective embodiments is omitted for sake of brevity.

An example system that can benefit in some circumstances from the use of one or more embodiments, is a data replication system. In different implementations. Data replication systems can copy host data from primary storage in computing device to secondary storage. For remote data replication systems, the systems can copy data from one geographical location to a remote secondary storage device located on a different location, e.g., for disaster recovery and fault tolerance, e.g., the SRDF System provided by DELL EMC, discussed above.

This figure depicts an example implementation of one or more embodiments where some of the features of example hosts 110A-B of FIG. 1 are embodied in data replication devices 210A-C. Data replication device 210A can be coupled to other data replication devices (e.g., data replication devices 210B-C) by employing both LAN 240 and WAN 245. As used herein, WAN 245 can be a network that can connect computer devices over a wide geographical area, e.g., a municipal network, national network, and global network. Use of WAN 245 to connect data replication device 210A to data replication device 210C can add additional potential shortcomings compared to connections employing LAN 240. For example, problems that include, but are not limited to customer limited network bandwidth pipes, round trip time (RTT) latency, packet drops, packet timeouts, and re-transmits, can also occur more frequently with the use of WAN 245.

With respect to the replication system example of FIG. 2, these problems can cause a degradation of performance that has the potential to compromise system functions. Data replication system traffic can be highly sensitive and can be affected by any changes in system design, such as intermediate network equipments. Aggravating this problem, data replication systems can be connected to several other storage systems across the global network and thus each individual data replication system can have a multitude of network links for each port.

It should be noted that, in some circumstances one or more embodiments can provide several beneficial results for different systems, e.g., specifically, the data replication system discussed with FIG. 2. For example, one or more embodiments can improve the overall performance of data replication system by dynamically controlling, scheduling and managing links across replication systems under different circumstances and with different goals. An example goal can include, but is not limited to, replicating as much data as possible by considering the sum of overall behavior of the links with performance key attributes into account. It should be noted that, in some circumstances one or more embodiments do not require any significant new hardware or extra dependencies.

Figure 3:
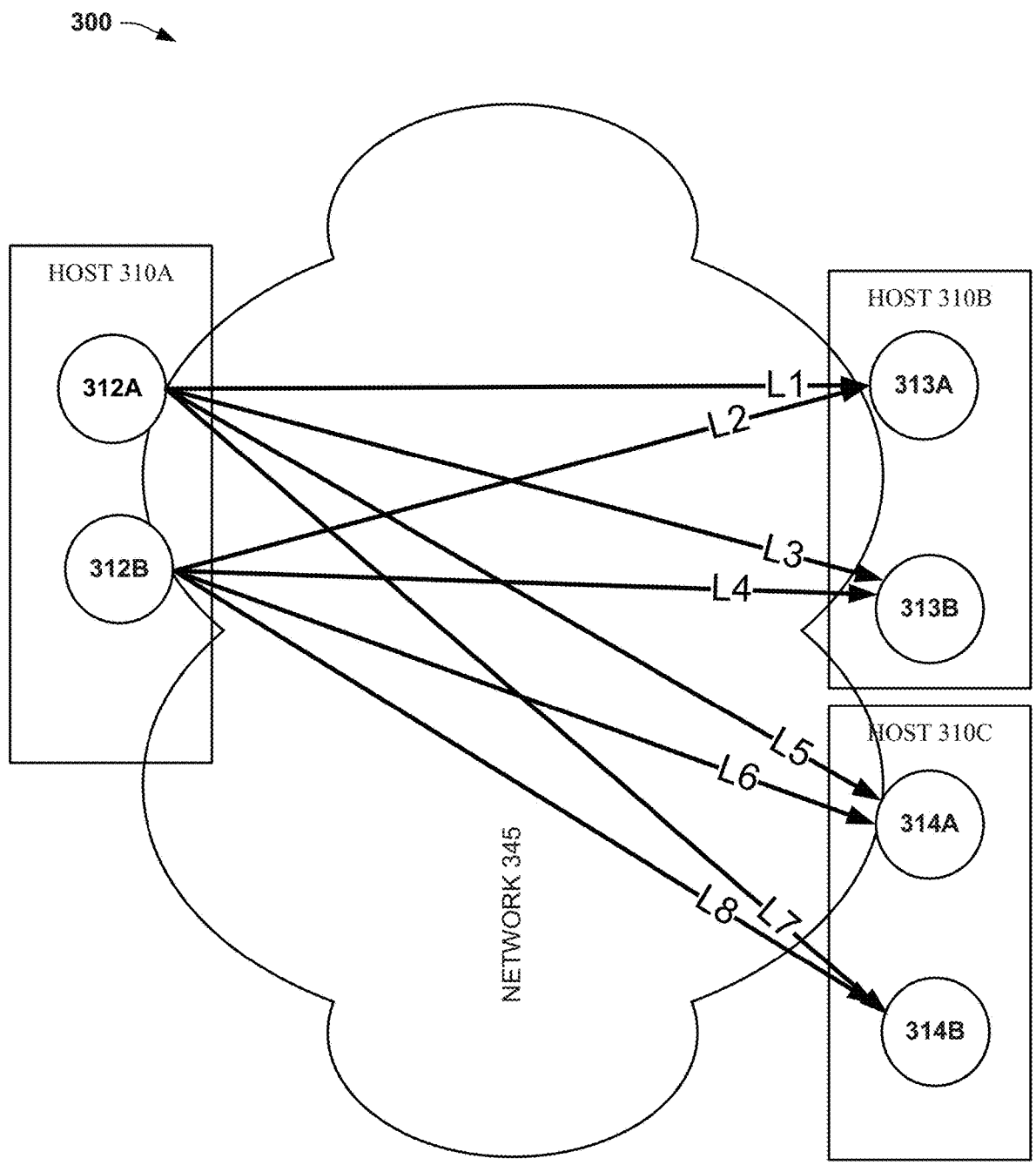
FIG. 3 depicts non-limiting examples of network links between computing devices that can be identified by one or more embodiments.

FIG. 3 depicts non-limiting examples 300 of network links L1-L8 between computing devices 310A-C that can be identified by one or more embodiments. Repetitive description of like elements and/or processes employed in respective embodiments is omitted for sake of brevity.

In this example, first device 310A can be connected to hosts 310B-C, with each host having two ports. It should be noted that two ports are used herein as a simplified example, with systems potentially using many more ports. In the example discussed with FIGS. 5-6 below, each device has four ports, e.g., two times the potential links depicted in FIG. 3.

As depicted, one or more embodiments can identify a link for each port of host 310A (e.g., 312A-B) connected to each port of hosts 310B-C, e.g., 313A-B and 314A-B respectively. In this example, this results in the two ports of host 310A times the four total ports of hosts 310B-C. It should be noted that not every port in a source or destination system is used for the detection of links, by one or more embodiments. For example, link mapper 126, when identifying links (e.g., L1-L8 of FIG. 3) can apply different criteria to determine whether a port would be used for a particular type of communication. In an example, one or more of the link evaluation characteristics discussed below with FIGS. 4-5 can be used by link mapper 126 to identify or reject links for use in other activities discussed below. Examples of this use for identification are included with the discussion of the link evaluation characteristics below.

Figure 4:
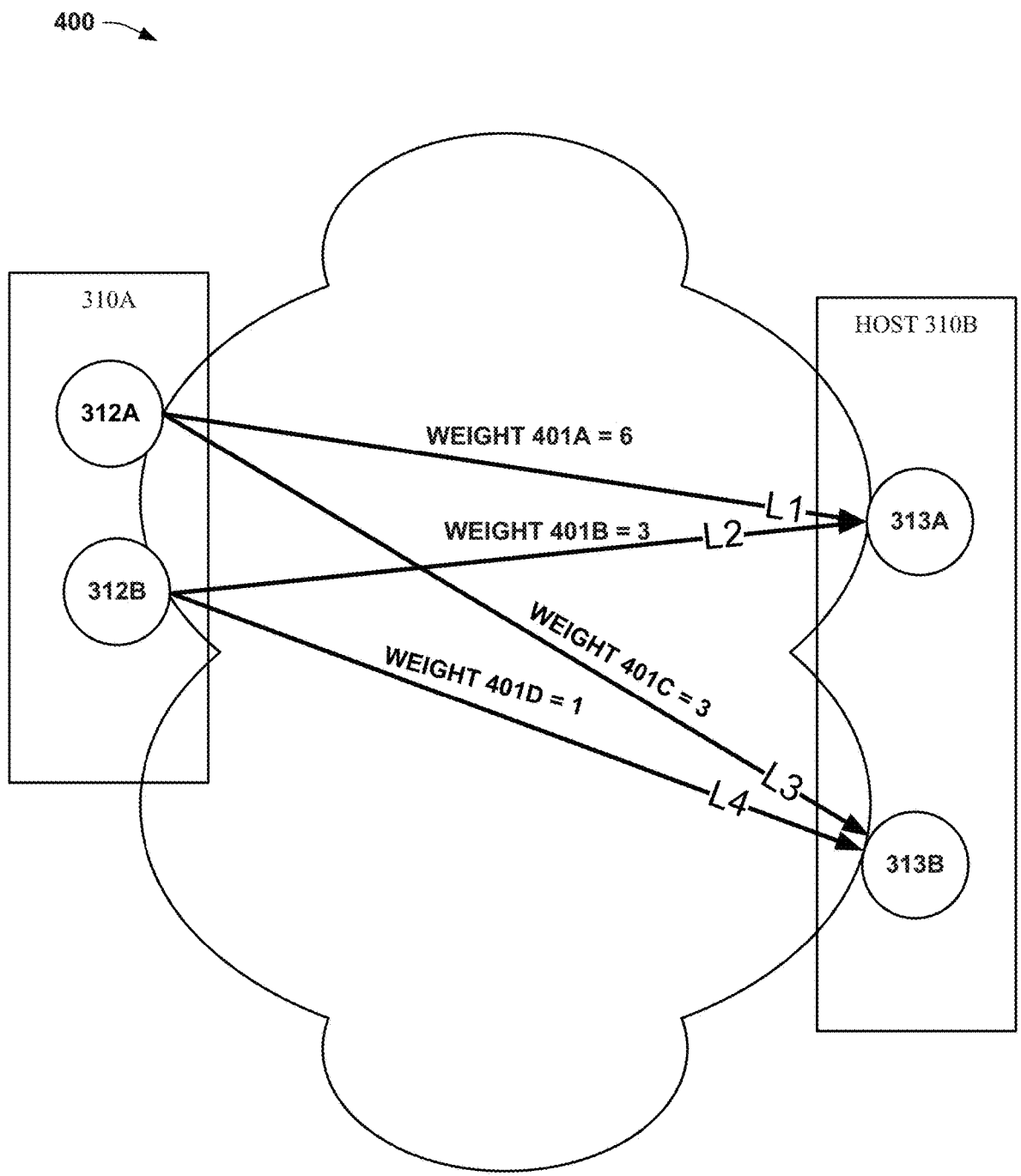
FIG. 4 depicts an example system that provides additional details for the example shown in FIG. 3.

In one or more embodiments not depicted in FIGS. 3-4, host 310B can have network 345 links that employ both a LAN and a WAN. For example, host 310A can employ a LAN (e.g., LAN 240) to connect to host 310B and also can have links that employ a WAN (e.g., WAN 245) to connect to host 310C. It should be noted that one of the ways that one or more embodiments can improve system performance is to compare and select between identified links of varying characteristics, e.g., LAN 240 and WAN 245.

FIG. 4 depicts an example system 400 that provides additional details for the example shown in FIG. 3. Repetitive description of like elements and/or processes employed in respective embodiments is omitted for sake of brevity. For example, as depicted in FIG. 3, host 310A can be coupled to host 310B by links L1-L4 by employing ports 312A-B and 313A-B respectively.

In one or more embodiments, the identified network links L1-L4 can be weighted (e.g., by link weighting component 124) resulting in weighted network links. This weighting can be done by different approaches, including comparing the links to one another by the application of one or more criteria, examples of which include, but are not limited to, the link evaluation characteristics described below.

An example link evaluation characteristic that can be employed by one or more embodiments, is the maximum transmission unit (MTU) of a link. MTU can be used to provide a measure of the size of the largest protocol data unit (PDU) that can be communicated in a single network layer transaction. In some circumstances, a larger frame size can cause a fewer number of frames to be required to send a particular amount of data. In addition, chunking data to communicated over a network (e.g., breaking large data payloads into smaller pieces for transmitting) can be rendered easier by a larger MTU.

Based at least on these beneficial characteristics, one or more embodiments can use a comparatively higher MTU value as factor that can indicate a lower weight, e.g., a lower preference for scheduling the use of the network link. Examples of the use of this link evaluation characteristic are discussed with the example of the weighing of sixteen links in FIGS. 5 and 6 below.

Another link evaluation characteristic that can be used (e.g., by link weighting component 128) to apply weights to identified links is the latency of the link. In one or more embodiments, latency can be a measure of the time required to transmit a packet across a network, e.g., from the time a transmit command is received by a host to the time an acknowledgement of the successful transmission is received by the sending host from the destination, e.g., the round-trip time (RTT) of the link. In some circumstances, and for some input/output profiles, latency is more important than data throughput, e.g., for some data replication system implementations. Thus, in some circumstances, throughput (e.g., another link evaluation characteristic, discussed below) can be omitted from link weighting determinations.

Based at least on these characteristics, one or more embodiments can use a comparatively lower latency value as factor that can indicate a lower weight, e.g., a lower preference for scheduling the use of the network link. Examples of the use of this link evaluation characteristic are discussed with the example of the weighing of sixteen links in FIGS. 5 and 6 below.

Another link evaluation characteristic that can be used (e.g., by link weighting component 128) to apply weights to identified links is the throughput of the link. In one or more embodiments, throughput can be a measurement of the quantity of data being sent/received by unit of time. In data replication systems, this can be an important metric for distance replication profiles, e.g., the SRDF/A profile used by the SRDF product described above. As noted above, in some implementations, the throughput metric can be preferred over the latency metric and, in these circumstances, the latency metric can be excluded from the weighing determination discussed below.

Based at least on these characteristics, one or more embodiments can use a comparatively high throughput value as a factor that can indicate a lower weight, e.g., a lower preference for scheduling the use of the network link. Examples of the use of this link evaluation characteristic are discussed with the example of the weighing of sixteen links in FIGS. 5 and 6 below.

Another link evaluation characteristic that can be used (e.g., by link weighting component 128) to apply weights to identified links is whether the link is to be used for reading (e.g., receiving) data from the link or writing (e.g., sending) data using the network link. In one or more embodiments, port links that receive data from the wire have more overhead as compared to links doing writes, for example, because of factors including, but not limited to, receiving MTU fragmented buffers from the wire, and allocating internal memory buffers fast enough to receive incoming buffers. Because many of the read operations are time sensitive (e.g., must be completed so as to enable data receiving to continue) in many cases the link can be degraded by dropped packets, e.g., because there is a failure to allocate memory buffers in time for data received from the wire.

Based at least on these characteristics, one or more embodiments can use the characteristic that a link is to be used for writes as a factor that can indicate a lower weight, e.g., a lower preference for scheduling the use of the network link. Examples of the use of this link evaluation characteristic are discussed with the example of the weighing of sixteen links in FIGS. 5 and 6 below.

Based on the weighting description described above, it should be evident to one having skill in the relevant arts, given the description herein, that one or more embodiments can aggregate multiple characteristics of link, compare the links to each other, and prefer for scheduling the links with comparatively worse characteristics. An example of a link having comparatively worse link characteristics, and thus a higher preference for scheduling, is a link with comparatively small MTU, high latency, low throughput, being used for a read operation. In one or more embodiments, overall system performance can be increased because of the distribution of resources across links of different characteristics.

FIG. 5 depicts an example 500 of links L1-L16 that can be analyzed, weighted, and scheduled, in accordance with one or more embodiments. Repetitive description of like elements and/or processes employed in respective embodiments is omitted for sake of brevity.

As noted above, one or more embodiments can identify multiple links between ports of different host devices (e.g., by employing link mapper 126), and these identified links can be weighted (e.g., by employing link weighting component 124) based on different link evaluation characteristics. In one or more embodiments, to facilitate the comparative weighting of network links a sorting and ranking process can be performed, e.g., by employing link ranking component 128.

In FIG. 5, four example link evaluation characteristics are provided for the weighting and scheduling of sixteen example links, e.g., MTU 502, latency 504, throughput 506, and read/write activity of the link. For each of the link evaluation characteristics, and example table of values is provided, and the characteristic values are sorted in either ascending or descending order, based on the characteristic. For example, as noted above, MTU 502 can be used for weighting links, with a higher MTU value indicating a lower weight. Thus, in the table depicted in FIG. 5, the links are sorted in descending order by MTU value. Based on the characteristics of throughput (e.g., larger value indicates a lower rank) throughput 506 also is sorted in descending order. Conversely, when latency 504, as discussed above, has a relatively high value, this can be indicative of a larger weight, thus latency 504 is sorted in ascending order.

In this implementation, as shown in latency 504 table, the assigned index value for the lowest latency is zero, while as shown in MTU 502 table and throughput 506 table, the assigned index value for the highest values are 1. It should be noted that these are non-limiting, example index values used to illustrate different features of one or more embodiments, and different values can be used. Also, these examples uses ascending (e.g., latency 504) and descending (e.g., MTU 502 and throughput 506) sorts to assign index values as a way to reflect how these values are reflected in a weighting scheme, e.g., lower latency and higher MTU values have lower weights.

As also discussed above, read/write 508 corresponds to whether a link is to be used for reading data from the network or writing data to the network. As noted above, in some circumstances, because of higher overhead, the reading process can reduce link performance compared to write operations. Thus, as discussed above, read operations can be assigned a higher weight for scheduling, e.g., the read/write 508 table is sorted in order by read and write values, with the more costly read operations at the bottom of the table. It should further be noted that these sorting approaches can also be implementation specific, based on different goals, e.g., instead of high throughput 506 causing a lower weight, the opposite could be reflected in an assigned weight.

FIG. 6 depicts tables 600 that illustrate an example approach to combining the sorted and ranked characteristics of example links L1-L16, in accordance with one or more embodiments. Repetitive description of like elements and/or processes employed in respective embodiments is omitted for sake of brevity.

One approach that can be used by one or more embodiments to combine the sorted and ranked characteristics of links L1-L16 is to assign index values from the top of the sorted tables (e.g., the higher-performance, less preferred to be scheduled position) to the bottom of the table (e.g., the lower-performance, more preferred to be scheduled position). Thus, as depicted in FIG. 5, for each link L1-L16, an index value has been assigned in the link evaluation characteristic tables, e.g., link L2 has an MTU 502 index value of 1, a latency 504 index value of 2, a throughput 506 value of 3, and a read/write 508 value of 0.

In table 610, the index values of the FIG. 5 tables are copied and arranged in the table adjacently to illustrate their combination. In one or more embodiments, to determine a weight for links L1-L16 the index values are added together, e.g., for L2, 1+2+3+0 equals a weight 660 of 6.

Based on the determined weights 660, scheduling order 670 is determined (e.g., by link scheduler 122), with scheduling preference to be allocated based on the highest weight 660. For example, link L12, having the largest weight of 10 is shown in table 620 as being first in scheduling order 670, while links L1, L2, L4, L10, and L15 are allocated the fifth and last scheduling time.

Having completed an example description of processes employed by one or more embodiments for identifying, ranking, weighting, and scheduling the use of example links L1-L16, it is important to note example aspects where implementation specific tuning can be used to change the importance of different link evaluation characteristics for the scheduling process. For example, in the discussion of FIG. 5, where index values are assigned based on the sorting of link evaluation characteristics, different increments of index value can be used in different embodiments, e.g., the difference between MTU values of 9000 and 1500 is so great, a higher value can be assigned, in alternative implementations, to 1500, e.g., instead of only assigning a 2 index value, a 3 or 4 can be used to more heavily weight the value. It would be appreciated, given the disclosure herein, how this tuning approach can be applied to other link evaluation characteristic tables as well.

Another modification to the example approach that can be used by implementations of one or more embodiments can omit or add link evaluation characteristics to the analysis. For example, as noted above, in some implementations latency or throughput may a more important characteristic than the other, e.g., instead of assigning any of the throughput 506 index values to the weight analysis, these are omitted. Because these example index values range from 1-3, this can, in some circumstances, change the final scheduling order. In an approach that is an alternative to omitting a characteristic, instead, one or more embodiments can assign relatively larger index values to the more significant characteristic, e.g., instead of the highest latency 504 having an index value of 5, a higher number can be used, e.g., 7. One having skill in the relevant arts, given the description herein would appreciate how this change in index allocation can be used to tune the significance of any of the evaluated characteristics described herein.

Another modification to the example approach can be the size of the scheduling window used to allocate scheduled times (e.g., by link scheduler 122) based on weights. For example, as depicted in table 610, while there are seven different weights allocated to links L1-L16, e.g., 4, 5, 6, 7, 8, 9, 10, the example schedule based on these weights has only five openings available. In one or more embodiments, additional scheduling opening can be available to match the assigned weights. In another modification, in one or more embodiments, different tie-breaking criteria can be selected to reorder the links with the same weights, e.g., the table 620 scheduled openings can first be sorted by weight, then sorted by throughput or another link evaluation characteristic. In some implementations, this increased granularity in the scheduling can improve the scheduling determination made by one or more embodiments.

Figure 7:
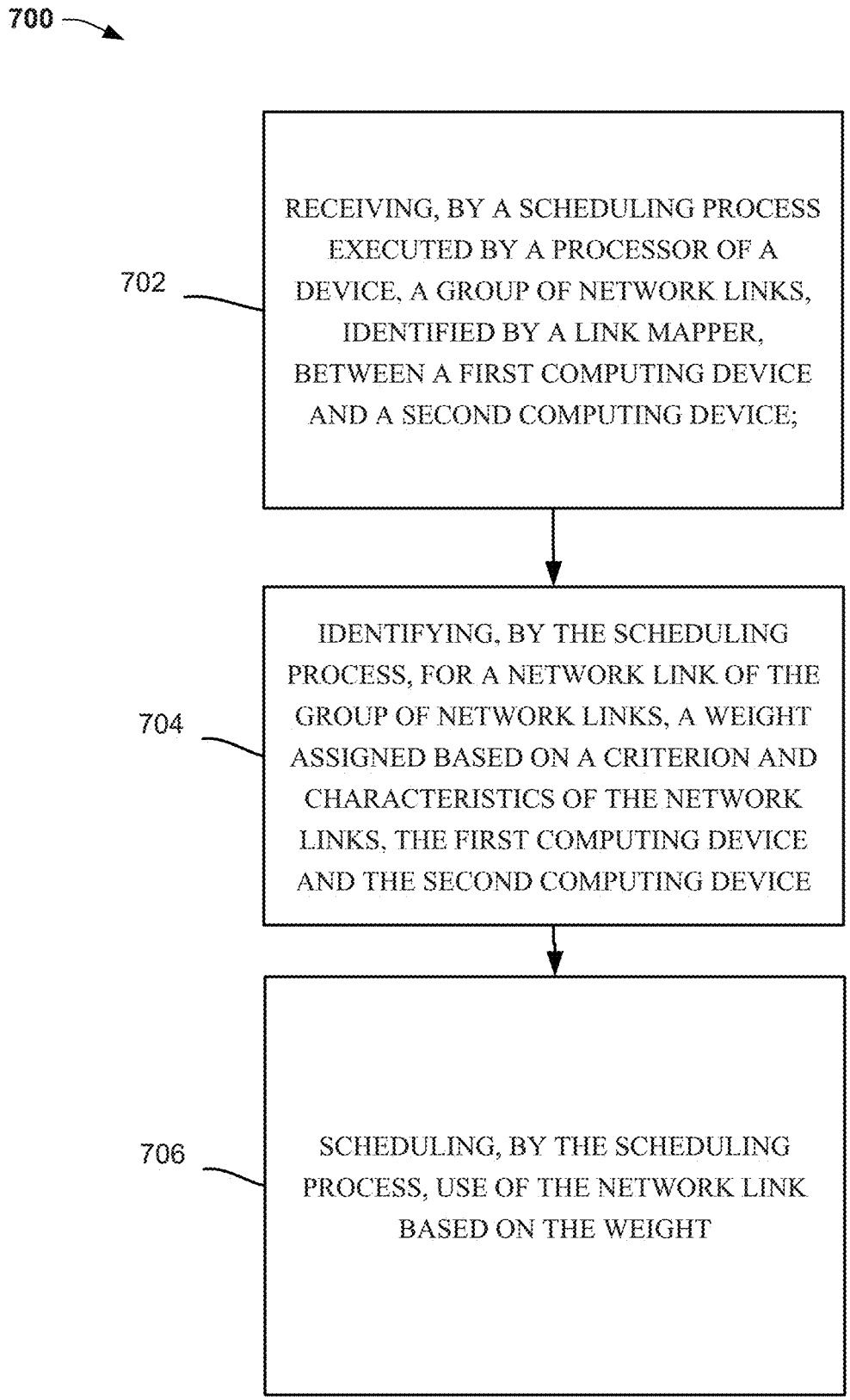
FIG. 7 illustrates an example flow diagram for a method that can facilitate evaluating, weighting, and scheduling the use of network links, in accordance with one or more embodiments.

FIG. 7 illustrates an example flow diagram for a method 700 that can facilitate evaluating, weighting, and scheduling the use of network links, in accordance with one or more embodiments. For purposes of brevity, description of like elements and/or processes employed in other embodiments is omitted.

At element 702, method 700 can comprise receiving, by a scheduling process (e.g., link scheduler 122) executed by a processor 130, a group of network links L1-L4, identified by a link mapper 126, between a first device 310A and a second device 310B.

At element 704, method 700 can comprise identifying, by the scheduling process (e.g., link scheduler 122), for a network link L1 of the group of network links L1-L4, a weight 401A (e.g., a weight of 6) that can be assigned based on a criterion (e.g., worse connections) and characteristics (e.g., MTU 502, latency 504, throughput 506, and read/write 508) of, the network links L1-L4, the first device 310A and the second device 310B.

At element 706, method 700 can comprise scheduling, by the scheduling process (e.g., link scheduler 122), use of the network link based on the weight, e.g., based on the weight of 6 for link L1, order table 620 has link L1 scheduled fifth in the schedule.

Figure 8:
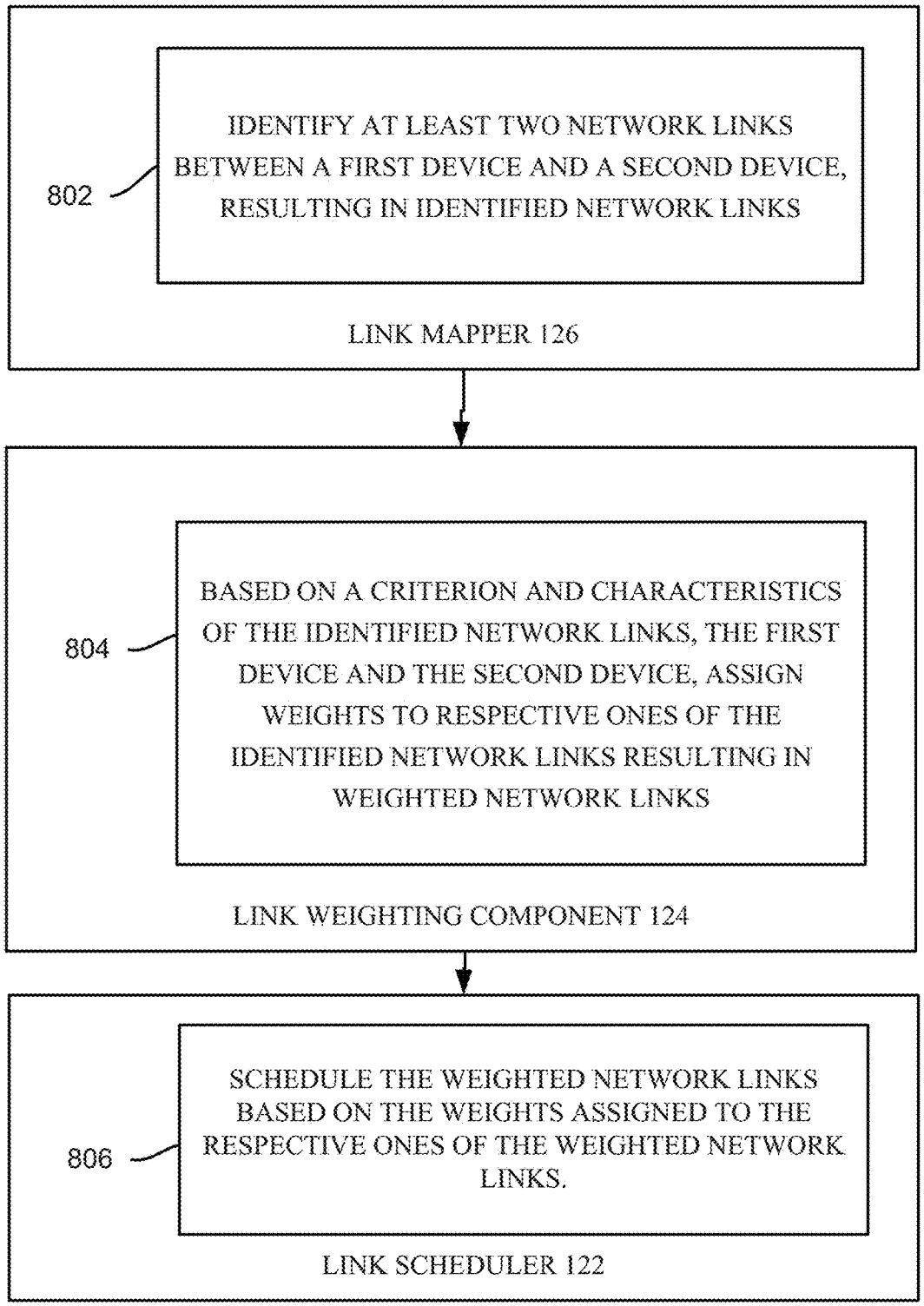
FIG. 8 is a flow diagram representing example operations of system comprising a link mapper, a link weighting component, and a link scheduler, in accordance with one or more embodiments.

FIG. 8 is a flow diagram 800 representing example operations of system comprising a link mapper 126, a link weighting component 124, and a link scheduler 122, in accordance with one or more embodiments. For purposes of brevity, description of like elements and/or processes employed in other embodiments is omitted.

Link mapper 126 can be configured 802 to identify two or more network links L1-L4 between a first device 310A and a second device 310B, resulting in identified network links, in accordance with one or more embodiments.

Link weighting component 124 can be configured 804 to assign weights 401A-D respectively to respective ones of the identified network links L1-L4 resulting in weighted network links, based on a criterion and characteristics (e.g., MTU 502, latency 504, throughput 506, and read/write 508) of the identified network links L1-L4, the first device 310A and the second device 310B, in accordance with one or more embodiments.

Link scheduler 122 can be configured 806 to schedule (e.g., order 620) the weighted network links L1-L4 based on the weights 401A-D assigned to the respective ones of the weighted network links, in accordance with one or more embodiments.

Figure 9:
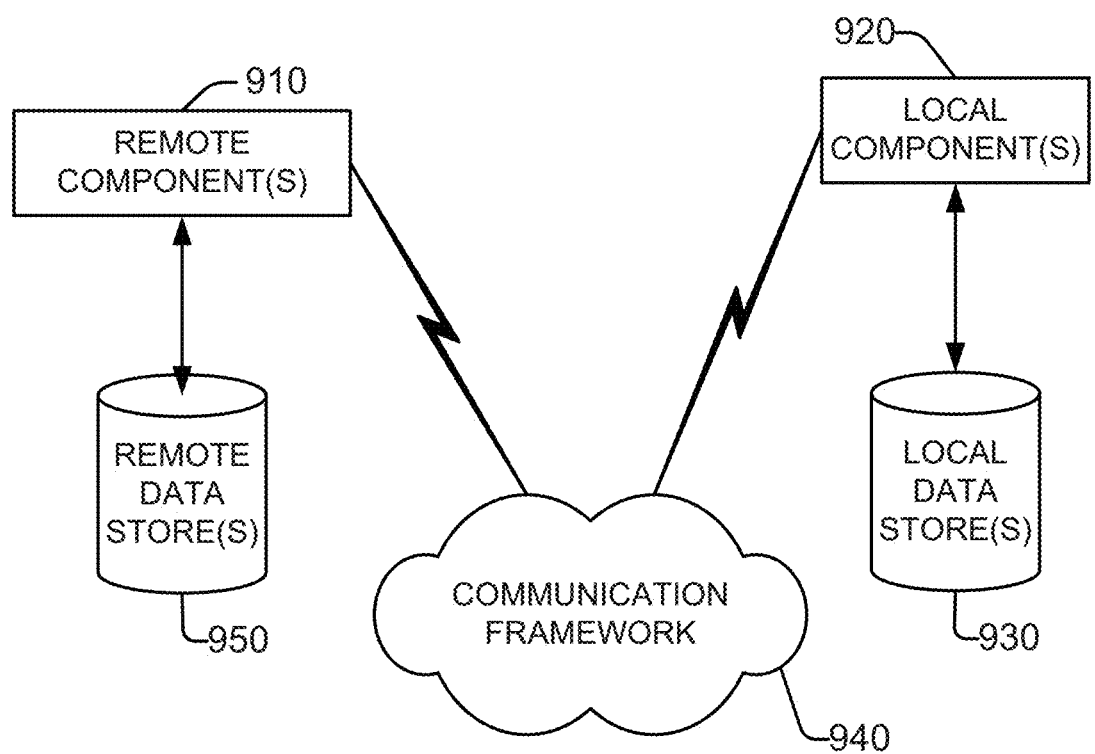
FIG. 9 depicts an example schematic block diagram of a computing environment with which the disclosed subject matter can interact, in accordance with one or more embodiments.

FIG. 9 is a schematic block diagram of a system 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices).

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

In order to provide a context for the various aspects of the disclosed subject matter, FIG. 8, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), non-volatile memory 1022 (see below), disk storage 1024 (see below), and memory storage, e.g., local data store(s) 930 and remote data store(s) 950, see below. Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Figure 10:
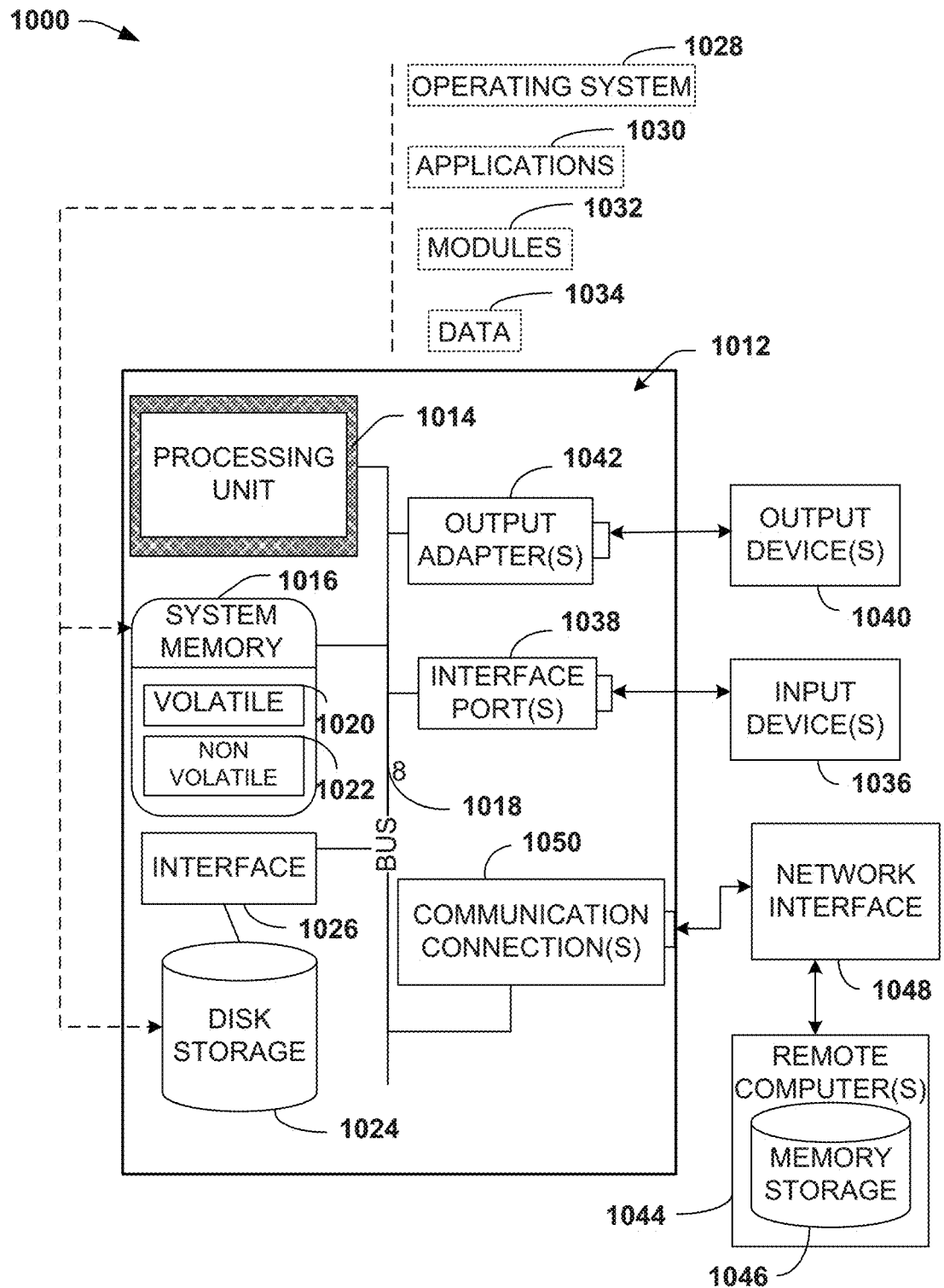
FIG. 10 illustrates an example block diagram of a computing system operable to execute the disclosed systems and methods in accordance with various aspects and implementations of the subject disclosure.

FIG. 10 illustrates a block diagram of a computing system 1000 operable to execute the disclosed systems and methods in accordance with one or more embodiments/implementations described herein. Computer 1012 can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1394), and small computer systems interface.

System memory 1016 can comprise volatile memory 1020 and non-volatile memory 1022. A basic input/output system, containing routines to transfer information between elements within computer 1012, such as during start-up, can be stored in non-volatile memory 1022. By way of illustration, and not limitation, non-volatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synch-Link dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining a mapped cluster schema, altering the mapped cluster schema until a rule is satisfied, allocating storage space according to the mapped cluster schema, and enabling a data operation corresponding to the allocated storage space, as disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in a suitable operating environment, e.g., computing system 1000. Such software comprises an operating system 1028. Operating system 1028, which can be stored on disk storage 1024, acts to control and allocate resources of computer 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial bus port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to system bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A system, comprising:
a memory that stores computer executable components; and
a processor that executes the computer executable components stored in the memory, wherein the computer executable components comprise:
a link mapper to identify at least two network links between a first device and a second device, resulting in identified network links;
based on a criterion and characteristics of the identified network links, the first device and the second device, a link weighting component to assign weights to respective ones of the identified network links resulting in weighted network links; and
a link scheduler to schedule use of the weighted network links based on the weights assigned to the respective ones of the weighted network links, wherein the characteristics comprise an estimated time required to allocate an internal memory buffer for the respective ones of the weighted network links.

2. The system of claim 1, further comprising, a link ranking component to analyze and rank the identified network links, wherein, further based on a write characteristic of the respective link, the respective link is ranked with a high scheduling priority that is higher than a low scheduling priority.

3. The system of claim 1, wherein the characteristics of the identified network links further comprise a maximum transmission unit value.

4. The system of claim 1, wherein the characteristics of the identified network links further comprise a latency value.

5. The system of claim 1, wherein the characteristics of the identified network links further comprise a throughput value, and that a weighted link is used for reading data.

6. The system of claim 1, wherein the characteristics of the identified network links further comprise that a weighted link is used for reading data.

7. The system of claim 1, wherein the criterion used by the link weighting component comprises a link quality, and wherein the link scheduler schedules the weighted network links in order from a lowest link quality to a highest link quality.

8. The system of claim 7, wherein the characteristics used by the link weighting component further comprise whether an analyzed link is reading data, and wherein the link weighting component weights the analyzed link as a lower link quality based on the analyzed link being determined to be reading data as compared to the analyzed link being determined to be writing data.

9. The system of claim 1, wherein the first device employs the identified network links to copy data from the first device to the second device as a part of a data protection system.

10. A computer-implemented method, comprising:
receiving, by a scheduling process executed by a processor of a device, a group of network links, identified by a link mapper, between a first computing device and a second computing device;
identifying, by the scheduling process, for a network link of the group of network links, a weight assigned based on a criterion and characteristics of the network links, the first computing device and the second computing device, wherein the characteristics comprise an estimated time required to allocate an internal memory buffer for the respective ones of the weighted network links; and
scheduling, by the scheduling process, use of the network link based on the weight.

11. The computer-implemented method of claim 10, further comprising, ranking, by the scheduling process, the network links based on a characteristic the characteristics of the network links, resulting in ranked network links, wherein the criterion is evaluated based on the ranked network links.

12. The computer-implemented method of claim 10, wherein the characteristics of the network links further comprise at least one of a maximum transmission unit, a latency, a throughput, and whether a weighted link is used for reading data.

13. The computer-implemented method of claim 10, wherein the criterion comprises a link quality, and wherein the scheduling the use of the network links comprises the scheduling of the use in order from a lowest link quality to a highest link quality.

14. The computer-implemented method of claim 13, wherein the characteristics further comprise whether an analyzed link is reading data, and wherein the analyzed link is weighted as being of lower link quality when the analyzed link is reading data as compared to when the analyzed link is writing data.

15. The computer-implemented method of claim 10, wherein the first computing device employs the network links to copy data from the first computing device to the second computing device as a part of a data protection system.

16. A non-transitory machine-readable medium comprising executable instructions that, when executed by a processor, facilitate performance of operations, the operations comprising:
identifying two or more network links between a first computing device and a second device, resulting in identified network links;
assigning weights to respective ones of the identified network links resulting in weighted network links, based on a criterion, a first characteristic of the identified network links, a second characteristic of the first device and a third characteristic of the second device; and
scheduling the weighted network links based on the weights assigned to the respective ones of the weighted network links, wherein the first characteristic comprises an estimated time required to allocate an internal memory buffer for the respective ones of the weighted network links.

17. The non-transitory machine-readable medium of claim 16, wherein the operations further comprise, ranking the identified network links based on the first characteristic of the identified network links, resulting in ranked network links, and wherein the criterion comprises whether the estimated time is sufficient to allocate the internal memory buffer.

18. The non-transitory machine-readable medium of claim 16, wherein a fourth characteristic of the identified network links comprises at least one of a maximum transmission unit, a latency, a throughput, or whether a weighted link is used for reading data, and wherein assigning weights to respective ones of the identified network links is further based on the fourth characteristic.

19. The non-transitory machine-readable medium of claim 16, wherein the criterion comprises link quality, and wherein the scheduling the use of the weighted network links comprises the scheduling of the use in order from a lowest link quality to a highest link quality.

20. The non-transitory machine-readable medium of claim 19, wherein the characteristics comprise whether an analyzed link is reading data, and wherein the analyzed link is weighted as being of lower link quality when the analyzed link is reading data as compared to when the analyzed link is writing data.

* * * * *